Feb. 2, 1971  R. J. MEIJER ET AL  3,559,398
HOT-GAS PISTON ENGINE

Filed May 6, 1968  5 Sheets-Sheet 5

INVENTORS
ROELF J. MEIJER
HENRICUS C.J. VAN BEUKERING
BY

AGENT

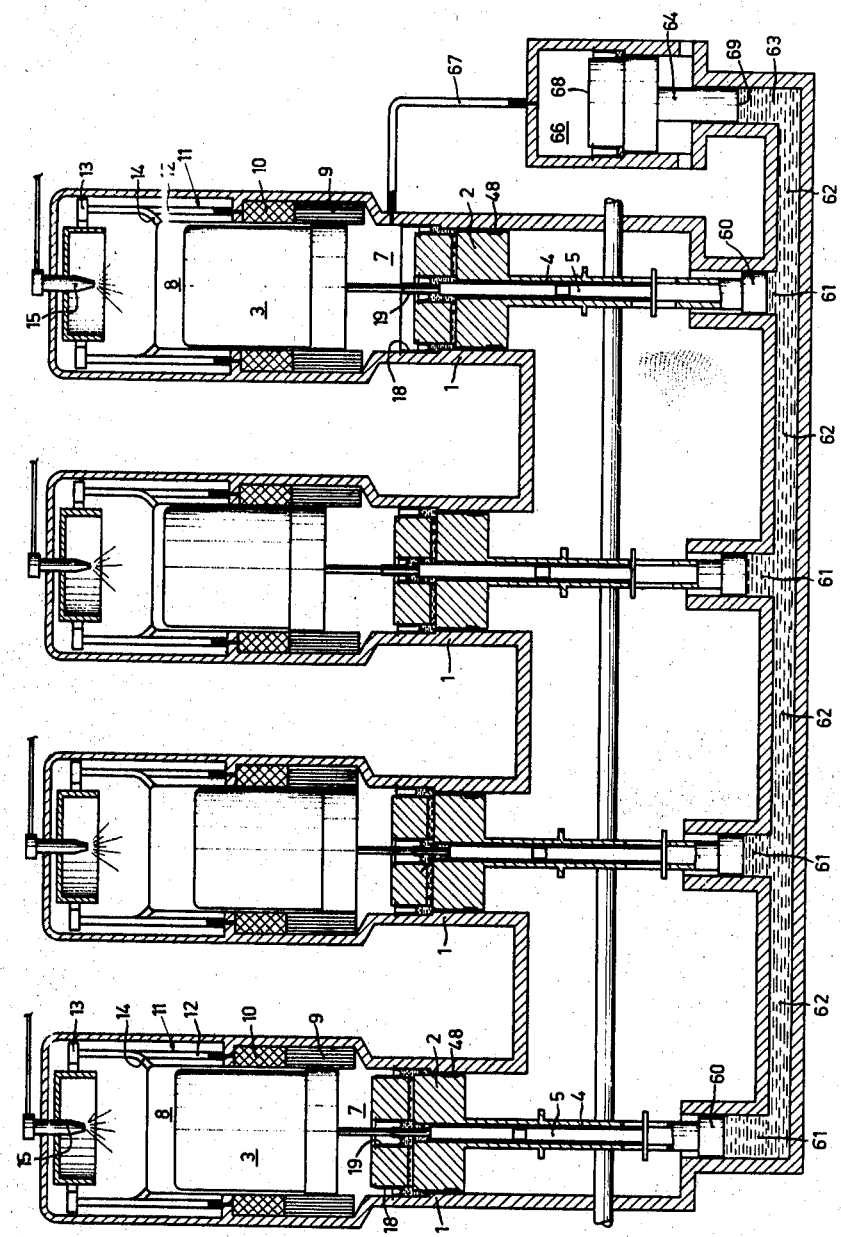

United States Patent Office 3,559,398
Patented Feb. 2, 1971

3,559,398
HOT-GAS PISTON ENGINE
Roelf Jan Meijer and Henricus Cornelis Johannes van Beukering, Emmasingel, Eindhoven, Netherlands, assignors, by mesne assignments, to U.S. Philips Corporation, New York, N.Y., a corporation of Delaware
Filed May 6, 1968, Ser. No. 726,667
Claims priority, application Netherlands, May 10, 1967, 6706508
Int. Cl. F03g 7/06
U.S. Cl. 60—24
16 Claims

ABSTRACT OF THE DISCLOSURE

A hot gas piston engine has within its cylinder-housing (i) a working space containing a compressible medium adjacent a working surface of the piston, (ii) a buffer space containing an incompressible fluid adjacent the opposite second surface of the piston, and (iii) an annular space between the cylinder and piston containing an incompressible fluid. Secured between the cylinder and piston is a rolling diaphragm seal, its two sides respectively in communication with the working space and medium therein and the annular space and fluid therein, to seal one space from the other. A regulating device maintains a substantially constant pressure difference across the seal. The product of the fluid pressure in the buffer space and the area of the piston's second surface is substantially equal to the product of the working medium's mean pressure and the area of the piston's working surface, whereby fluid forces acting on the piston from the working and buffer spaces are substantially neutralized.

---

This invention relates to a hot-gas piston engine comprising one or more working spaces each formed by a space of variable volume and a comparatively high mean temperature in operation and a space of likewise variable volume and comparatively low temperature in operation; these spaces communicate with one another through a regenerator through which a working medium can flow on its way from one space to another and vice versa. The volumes of the said spaces are varied by means of pistons each coupled to a driving mechanism. A seal between each piston has one side bounding one of the said spaces and the other side bounding a space which does not belong to the working space, and the cooperating cylinder wall or, as the case may be, a piston rod of another piston which passes through the cylinder wall, the seal being formed by a rolling diaphragm one side of which also bounds the working space and the other side of which engages liquid. A regulating device is provided to maintain a substantially constant pressure difference across each rolling diaphragm and the pressures acting on the relevant piston on the average being neutralized.

Hot-gas piston engines of the above-mentioned kind are known in designs of the displacer type and of the twin-piston type. In these hot-gas piston engines the working space contains a working medium at high pressure which is alternately compressed and expended. In order to compensate for the high compressive forces acting on the pistons bounding the working space at one side and bounding another space at their other side, it is known to form the other space as a buffer space which contains working medium at the mean pressure that prevails in the working space. To separate the working space hermetically from the buffer space, it is known to form the seal between a piston and the cooperating cylinder wall as a rolling diaphragm supported by liquid, one side of the rolling diaphragm also bounding the working space and its other side engaging liquid. Since the buffer space contains working mdeium at the average pressure, which prevails in the working space, it is necessary to ensure that on the one hand this working medium is not contaminated by the supporting liquid and, on the other hand, working medium cannot reach the space containing the supporting liquid. To this end, between the piston and the cylinder wall there is provided a second seal in the form of a rolling diaphragm, one side of which also bounds the buffer space and the other side of which engages supporting liquid. Furthermore each piston is connected to a driving mechanism via a piston rod which passes through the wall of the buffer space. To prevent any loss of the expensive working medium to the surroundings, it is known to form also the seal between the piston rod and the wall of the buffer space as a rolling diaphragm supported by liquid. This implies that three rolling diaphragm seals are necessary for each piston. In hot-gas piston engines of the displacer type, another such seal is required, namely that between the piston and the displacer rod passing through the piston. Each of the said rolling diaphragm seals requires the use of a regulating device which provides for a constant pressure difference across the rolling diaphragm. All these rolling diaphragm seals with the associated regulating equipment render the engine expensive and gives rise to difficulties in mounting and dismounting due to several of the rolling diaphragms being difficult of access.

Another disadvantage of these known engines is that the buffer space contains a working medium at the average pressure which prevails in the working space. When the engines are regulated by varying the mean pressure level it is also necessary to match the pressure in the buffer space. This implies that an additional amount of medium must be supplied or drained, which detrimentally affects the rate of regulation.

A hot-gas piston engine according to the invention suppresses these disadvantages and is characterized in that the side of each piston remote from the working space bounds a space containing a medium other than the working medium, and a surface of each piston connected thereto which is remote from the working space bounds a space which contains a medium at a pressure such that the product of this pressure and the relevant surface is substantially equal to the product of the mean pressure which prevails in the working space and the surface of the relevant piston which is adjacent the working space. Since in a hot-gas piston engine according to the invention, the side of a piston remote from the working space does not now bound a space containing working medium at the average pressure, it is no longer necessary for this space to be hermetically sealed. This implies that two rolling diaphragm seals less need be used for each piston, resulting in a construction which is materially cheaper.

In another advantageous embodiment of a hot-gas piston engine according to the invention the side of each piston remote from the working space bounds a space containing liquid, which space communicates with a first further space containing liquid; this latter space is separated through a piston which can move freely from a space containing working medium at a pressure such that the product of the pressure of the liquid and the surface of the relevant piston engaging the liquid is at least substantially equal to the product of the mean pressure prevailing in the working space and the surface of the relevant piston adjacent this space. In this hot-gas piston engine, the compressive forces exerted on the piston are thus neutralised by a liquid column present behind the piston. In hot-gas piston engines comprising a plurality of working spaces, and in which the pistons associated with the various working spaces move with a mutual phase difference, the spaces on the sides of the pistons remote from the working spaces, which spaces are filled with liquid, all communicate with one another and also with only one first further space containing liquid which is separated from a second further space containing working medium by a piston which can move freely. During the operation of this engine, the total volume of the spaces containing liquid will vary but slightly so that the gas volume in the second further space can be low, which has a favourable influence on the rate of regulation of this engine.

In order to ensure that the liquid-filled space invariably contains a sufficient amount of liquid, in another embodiment the engine includes one or more pumping devices for the supply of liquid to the spaces on the sides of the pistons remote from the working space, the wall of the first further space having an aperture which can be closed or opened by the piston or a slide connected thereto. A continuous supply of liquid to the said spaces is thus obtained by means of the pumping device, the piston or the slide connected thereto regulating the drainage so that a constant amount of liquid is present at any time.

The hot-gas piston engine above described, has the disadvantage that, in order to limit the losses through flow, the conduits connecting the said spaces containing liquid have to be fairly large (large diameter), which is at the expense of the structural height. Furthermore the reciprocating masses of oil cause a certain unbalance. These disadvantages are suppressed for the greater part in an advantageous embodiment of the hot-gas piston according to the invention, in which the side of each piston remote from the working space is provided with a piston rod which is coupled to a further piston movable in a cylinder, the side of the further piston which is remote from the relevant piston bounding a space which contains a medium at a pressure such that the product of this pressure and the surface of the piston is substantially equal to the product of the mean pressure in the working space and the surface of the relevant piston. The pressure of the medium in the space bounded by the further piston will be given a value which exceeds the mean pressure. This results in the surface area of the further piston being smaller than that of the relevant piston, so that the reciprocating masses of liquid will also be small.

In another advantageous embodiment the further piston has a diameter which is smaller than that of the first piston, the surface of the further piston which is remote from the first piston bounding a space filled with liquid, which space is bounded on the other hand by a small piston which is connected to a piston of a larger diameter, which in turn bounds a space in which the mean pressure prevailing in the working space occurs, the ratio between the diameters being such that the average pressure on the further piston exactly compensate for the compressive forces on the piston.

In another advantageous embodiment, which is designed as a hot-gas piston engine of the displacer type, the engine comprises at least two aligned cylinders in each of which a displacer and a piston can move, the two displacers and the two pistons being connected together through a displacer rod and a piston rod respectively. In this engine, the pressure that prevails in the working space on one cylinder serves to compensate for the pressure exerted on the relevant piston by the medium in the other working space, and vice versa.

In order that the invention may be readily carried into effect it will now be described in detail, by way of example, with reference to the accompanying diagrammatic drawings, in which.

Figure 4:
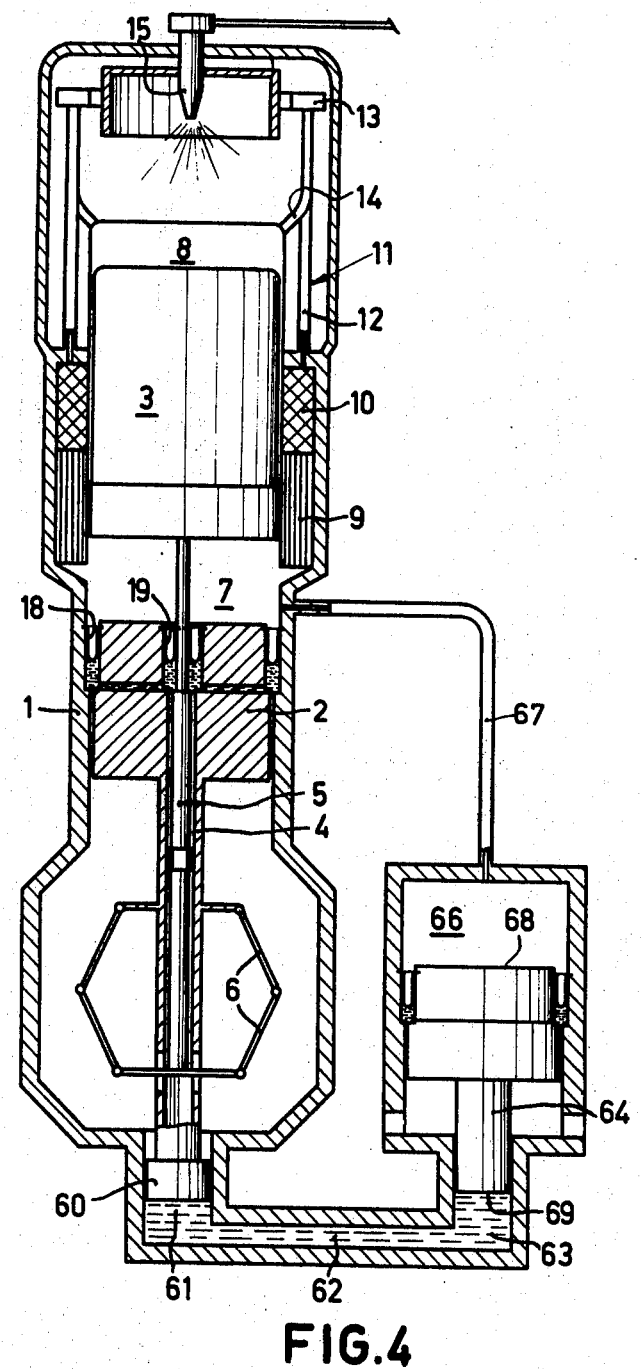

FIGS. 4 and 5 show, not to scale, a one-cylinder hot-gas engine and a four-cylinder hot-gas engine respectively, the side of each piston remote from the working space being provided with a piston rod which supports a further piston of smaller diameter, which bounds a space containing liquid on its side remote from the relevant piston, the pressure in the liquid being higher than the pressure in the working space.

FIG. 6 shows, not to scale, a hot-gas engine of the boxer type which comprises two aligned cylinders.

Figure 1:
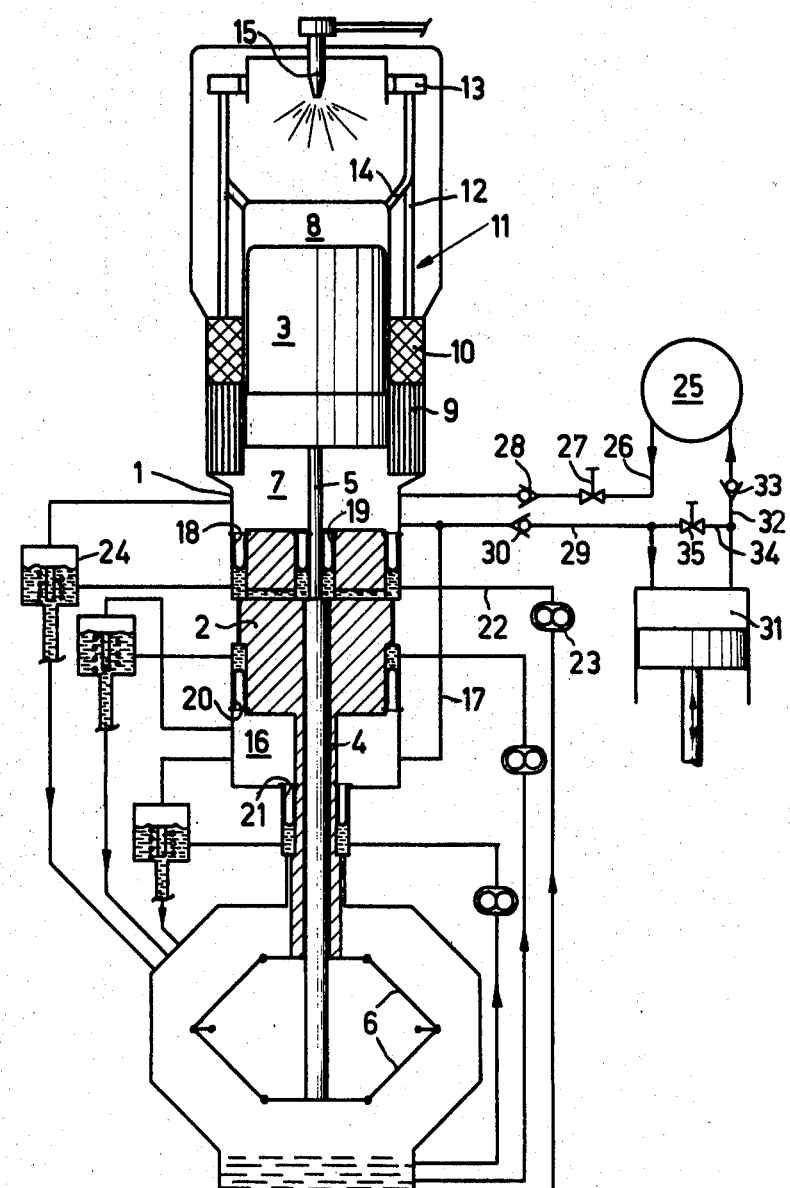
FIG. 1 shows, not to scale, the hot-gas engine of known type.

Referring now to FIG. 1, the reference numeral 1 indicates a cylinder in which a piston 2 and a displacer 3 can move. The piston 2 and the displacer 3 are coupled via a piston rod 4 and a displacer rod 5, respectively, to a rhombic like driving mechanism 6. A compression space 7 exists between the piston 2 and the displacer 3 and an expansion space 8 exists above the displacer 3. The spaces 7 and 8 communicate with each other via a cooler 9, a regenerator 10 and a heater 11, which is formed by a plurality of pipes 12 connected on the one hand to the regenerator 10 and on the other to an annular channel 13, and a plurality of pipes 14 connected on the one hand to the annular channel 13 and terminating on the other hand into the expansion space 8. Heat is supplied to the heater from a burner 15. Under the piston 2 is a space 16 which contains a working medium, as does the working space formed by the spaces 7 and 8 and the conduits connecting them, which space 16 communicates through a narrow conduit 17 with the space 7. Thus, the space 16 will invariably exhibit the mean pressure which prevails in the space 7, so that the compressive forces exerted, during operation, on the upper side of the piston are on the average neutralised by the pressure which prevails in the space 16. Between the piston 2 and the cylinder 1 is a rolling diaphragm seal 18, the rolling diaphragm of which, on the one hand, bounds the space 7 and on the other engages liquid, while between the piston 2 and the displacer rod 5 there is likewise a roller diaphragm seal 19, the rolling diaphragm of which also bounds the working space 7 on the one hand and engages liquid on the other. To prevent liquid present in the space 16 from finding its way into the working medium, between the piston 2 and the cylinder 1 there is a second rolling diaphragm 20, the rolling diaphragm of which bounds the space 16 on the one hand and engages liquid on the other. To prevent working medium from escaping from the space 16 to a motor case 21, a rolling diaphragm seal 21 which is present between the wall of space 16 and the piston rod 4 bounds the space 16 on the one hand and engages liquid on the other. In order to ensure that a sufficient amount of liquid is invariably present at each rolling diaphragm seal and a substantially constant pressure difference prevails across each rolling diaphragm, a conduit 22 including a pumping device 23 for the supply of liquid is provided at each rolling diaphragm seal. Further, a regulating device 24 is provided for each seal to ensure that the excess liquid supplied is drained off. The operation and construction of the rolling diaphragm seals and of the regulating devices is known and will not be described in detail.

The hot-gas engine of FIG. 1 also comprises a storage tank 25 which contains working medium and which is connected to the working space 7 through a conduit 26 for the supply of medium, which includes an adjustable shut-off cock 27 and a non-return valve 28. Further connected to the space 7 is a conduit 29 for the drainage of medium, which includes a non-return valve 30 and which is connected to the inlet of a compressor 31 the outlet of which is connected through a conduit 32 including a non-return valve 33 to the storage tank 25. The conduits 29 and 32 are connected by a channel 34 including a shut-off cock 35. By opening the shut-off cock 27 medium is supplied from the tank 25 to the space 7 so that the mean pressure level in the working space rises and the power of the hot-gas engine increases. The mean pressure in the space 16 will also increase so that as it were an additional amount of medium is supplied in order to maintain the pressure in the space 16 at the correct level. This has a retarding effect on the rate of regulation. The same effect occurs, but in the reverse direction, when the shut-off cock 35 is closed, so that the compressor 31 commences to drain medium from space 7 to the storage tank 25. Consequently the mean pressure in the working space 7, 8 drops, but the pressure in the space 16 will then also have to fall, which means that an additional amount of medium must be drained off. In addition to this disadvantageous retarding effect on the rate of regulation, the presence of space 16 requires the use of four roller diaphragm seals for each piston, which renders the construction expensive.

Figure 2:
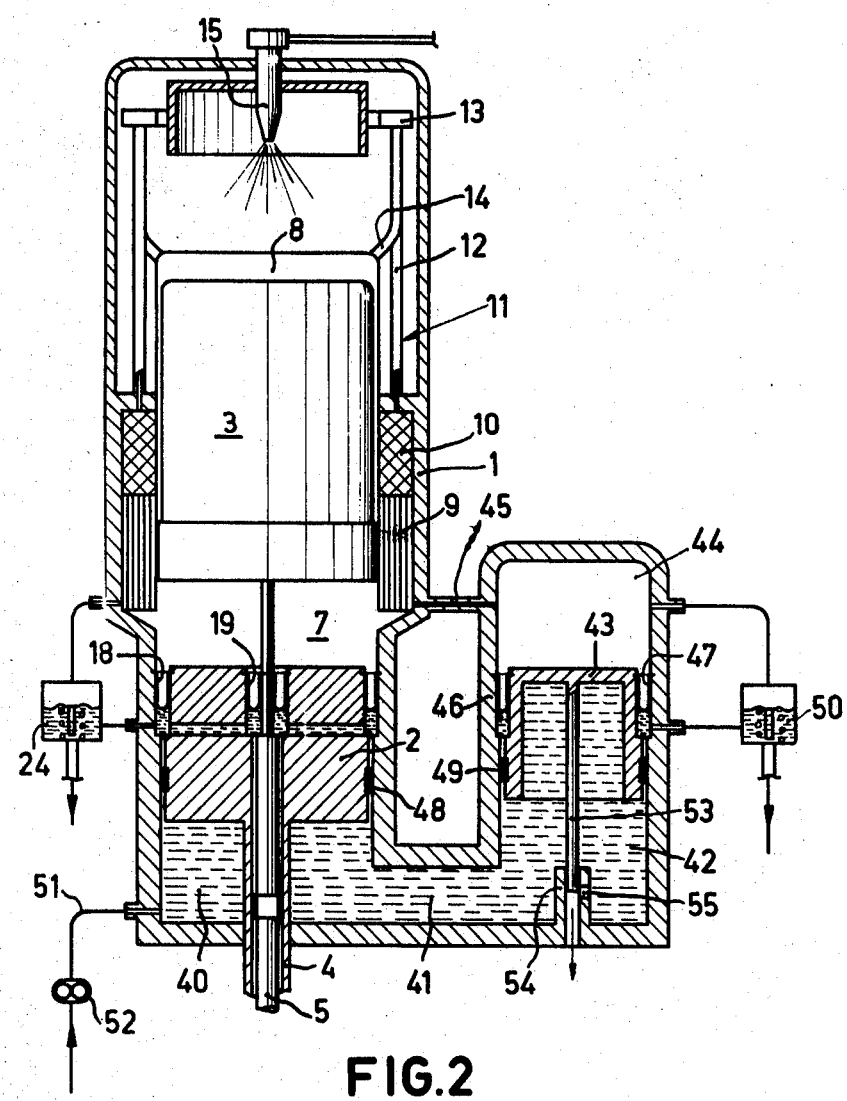
FIG. 2 shows, not to scale, a hot-gas engine in which the space under the piston is filled with liquid.

FIG. 2 shows a hot-gas engine which roughly corresponds to that of FIG. 1, so that corresponding elements are indicated by the same reference numerals. In this hot-gas engine, a space 40 under the piston 2 is filled with liquid. The space 40 communicates via a channel 41 with a further space 42 which is likewise filled with liquid and bounded on its upper side by a piston 43 the other side of which bounds a space 44 containing working medium, which communicates through a narrow conduit 45 with the space 7 so that the mean pressure which prevails in space 7 will adjust itself in space 44. This means that the pressure in the liquid in the spaces 40, 41 and 42 will be equal to the mean pressure which prevails in the space 7 so that the compressive forces acting on the piston 2 are on the average neutralized. The seal between the piston 43 and the cylinder 46 is formed by a roller diaphragm 47. Since the pistons 2 and 43 engage liquid, pumping piston springs 48 and 49 may be used for supplying liquid to the spaces under the rolling diaphragms 18, 19 and 47, while regulating devices 24 and 50 are present for the removal of oil from these spaces. To ensure that the spaces 40 and 41 invariably contain a sufficient amount of liquid, a supply conduit 51 including a pumping device 52 is connected to the said spaces. Furthermore the piston 43 is provided with a piston rod 53 which can move in a sleeve 54 having an aperture 55. If the spaces 40, 41 and 43 contain an excess of liquid, then in the upper position of piston 43, the aperture 55 will be uncovered so that liquid can flow away through it. As may be seen from the figure, only two rolling diaphragm seals 18 and 19 are required in the hot-gas engine of FIG. 2 for sealing the piston 2 relative to the cylinder and the displacer rod. This implies that the number of rolling diaphragm seals can be reduced by 50% relative to the hot-gas engine of FIG. 1. Thus the mean pressure prevails in space 44. It will be evident that a higher pressure can be used, if desired, in which event the surface of piston 2 which engages liquid may be reduced by increasing the diameter of the piston rod, in such manner that the compressive forces on the piston 2 are on the average neutralized. The advantage of a higher compensation pressure is that the reciprocating masses of liquid are smaller.

Figure 3:
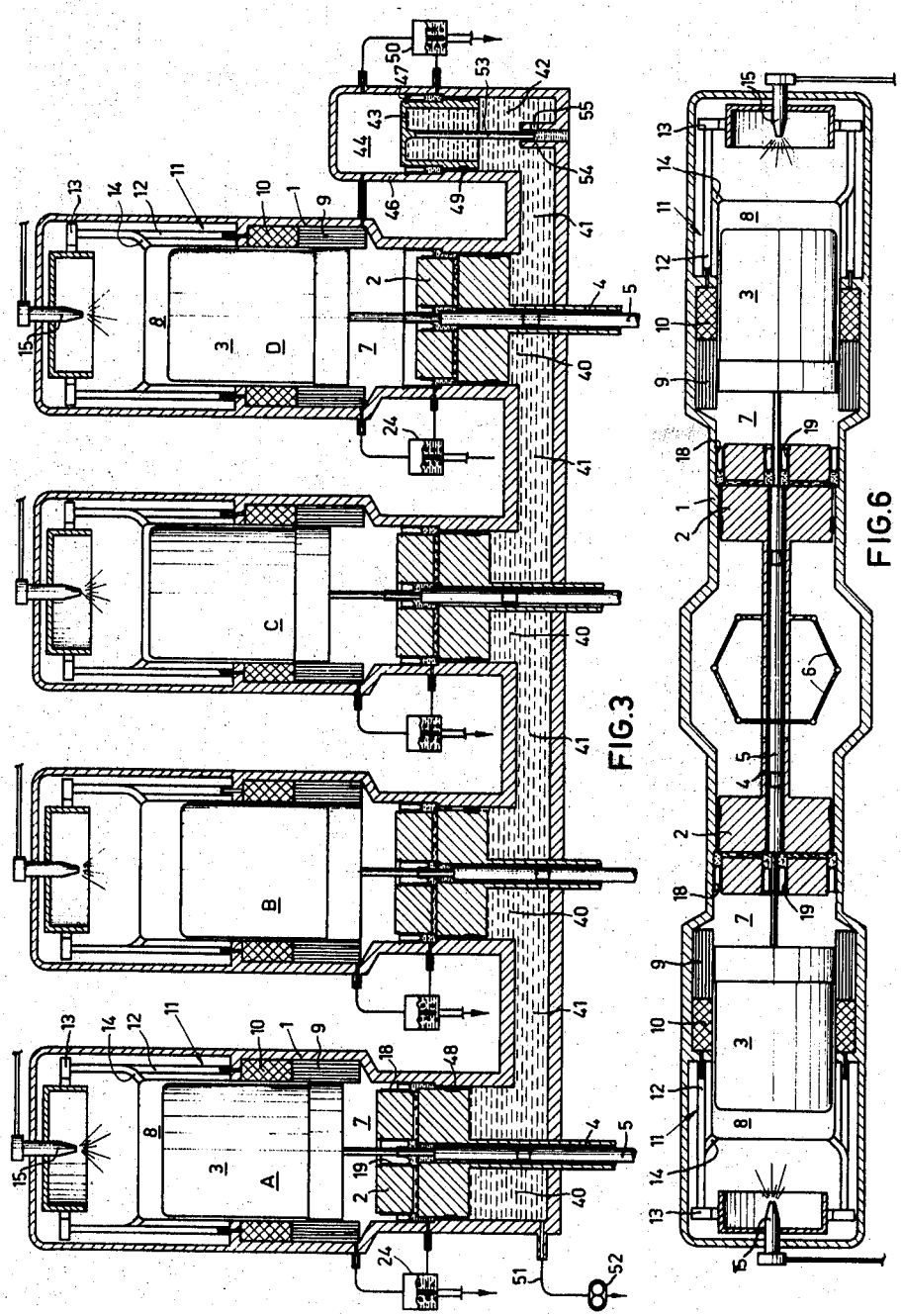
FIG. 3 shows, not to scale, the multi-cylinder hot-gas engine in which the spaces under the pistons are filled with liquid and communicate freely with one another.

The advantages afforded by filling the space 40 under the piston 2 with liquid show to even greater advantage in multi-cylinder hot-gas engines, such as shown in FIG. 3. This figure shows a hot-gas engine having four cylinders A, B, C and D each of a structure which fully corresponds to that of the hot-gas engine shown in FIG. 2. The spaces 40 under the pistons 2 are filled with oil and communicate freely with one another. The hot-gas engine of FIG. 3 requires only one further space 42 containing liquid, which communicates with the spaces containing liquid under the pistons 2. The pistons 2 are each coupled to a driving mechanism to move them with a mutual phase difference of 90°. This implies that, when the pistons 2 are moved, the total volume of all spaces 40 together will vary but slightly, which means that the space 42, and hence the space 44 above the piston 43, can be small. The rate of regulation of this engine will be high, since substantially no working medium need be supplied to, or drained from, the space 44 because of its small volume.

FIG. 4 shows a one-cylinder hot-gas engine in which the piston rod 4 has been lengthened so as to extend beyond the driving mechanism, the piston rod 4 on its side remote from piston 2 supporting a further piston 60 of small diameter. The piston 60 bounds a space 61 filled with liquid, which communicates through a channel 62 with a further space 63 filled with liquid, which is bounded by a piston 64 coupled to a piston 65 to greater diameter. The upper side of piston 65 bounds a space 66 which communicates through a narrow conduit 67 with space 7 so that the mean pressure of space 7 will prevail in space 66. The ratio between the surface 68 of piston 65 and the surface 69 of piston 64 is such that a pressure higher than the mean pressure in space 7 will prevail in the liquid in the spaces 61, 62 and 63. This pressure is so high that the product of this pressure and the surface of piston 60 is exactly equal to the product of the surface of piston 2 and the mean pressure which prevails in space 7. By using a higher pressure in the liquid, a hot-gas engine is thus obtained in which the reciprocating masses of liquid will be small so that there is no risk of undue unbalance forces as a result of the moving masses of liquid. Further, this hot-gas engine also has the advantage which already occurred in the hot-gas engines described hereinbefore, namely that the piston 2 is sealed by only two rolling diaphragms. Another advantage of the hot-gas engine of FIG. 4 is that the upper structure, that is the portion of the hot-gas engine which projects above the driving mechanism, is small. The advantages of the hot-gas engine of FIG. 4 are even more apparent in the four-cylinder type of FIG. 5. The construction and operation of this hot-gas engine will be evident after the foregoing.

In the hot-gas engines of FIGS. 4 and 5, the mean working pressure prevails in space 66. This means that the ratio between the surfaces 68 and 69 must be equal to that between the surfaces of the piston 2 and 60. Under certain conditions it may be advantageous to choose a higher pressure in the space 66, for example, the maximum pressure which occurs in the working space. The surface 68 may then be smaller, which also results in a reduced volume of space 66.

FIG. 6 shows a hot-gas engine of the boxer type, that is to say of the type with two aligned cylinders. The pistons 2 are coupled together by means of piston rod 4, and the two displacers 3 are connected together by means of displacer rod 5. The seal between the pistons 2 and the relevant cylinder wall and piston rod, respectively, is again formed by a roller diaphragm so that in this case also only two roller diaphragm seals are required for each piston. In this hot-gas engine the compressive forces exerted on the one piston 2 are neutralized by the compressive forces exerted on the other piston 2.

What is claimed is:

1. A hot gas engine including a cylinder and a compression piston reciprocally movable therein adjacent the cylinder's inner walls and defining at opposite ends of the cylinder a working space with compressible medium disposable therein and a buffer space, the ends of the piston being the working surface and remote surface respectively corresponding to said working and buffer spaces, further comprising:

(a) a rolling diaphragm seal secured between the piston and said inner walls of the cylinder, the seal having one side communicating with the working space and said compressible medium therein, the seal having an opposite side, and the cylinder's inner walls and piston defining on said opposite side an annular space for containing a liquid, (b) a regulating means interconnecting the working and annular spaces for maintaining a substantially constant pressure difference across the seal, (c) an auxiliary chamber;

(d) an auxiliary piston reciprocally movable in the auxiliary chamber which defines at opposite ends of the piston first and second spaces respectively in communication with the working and buffer spaces, and (e) a second rolling diaphragm seal secured between the auxiliary piston and cylinder which define on one side of the seal a second annular space for incompressible fluid disposable therein, the opposite side of the seal communicating with the first space and working medium containable therein, working medium in the first space having pressure substantially equal to the mean pressure of the working medium in the working space, the buffer space adapted to contain a substantially incompressible fluid, the product of the buffer fluid pressure and the area of the piston's remote surface being substantially equal to the product of the working-medium mean pressure and the area of the piston's working surface, whereby fluid forces developed in the working space and acting on the piston are substantially neutralized by opposing fluid forces developed in the buffer space.

2. A hot gas engine as defined in claim 1 wherein said buffer and annular spaces are in communication, and pump means are provided between the piston and cylinder for pumping incompressible fluid as needed from the buffer space to the annular space.

3. A hot gas engine as defined in claim 1, and further including a displacer piston reciprocally movable in the cylinder and having a rod which extends through the compression piston, the two pistons being movable with a mutual phase difference thereby defining said working space between them and an expansion space, the engine further comprising a third rolling diaphragm seal secured between the displacer piston rod and adjacent portions of the compression piston, one side of this seal communicating with the working space and working medium containable therein, the rod and compression piston defining a third annular space adjacent the opposite side of the seal, with incompressible fluid containable therein.

4. A hot gas engine having a plurality of cooperating piston and cylinder means as defined in claim 1, the engine having a single auxiliary chamber in communication with the buffer spaces of all the cylinders.

5. A hot gas engine as defined in claim 1 wherein the area of the compression piston working surface is substantially greater than the area of its remote surface, and the pressure of the fluid in the buffer space adjacent said remote surface of the piston is substantially greater than the mean pressure of the working medium.

6. A hot gas engine as defined in claim 1 wherein (a) said compression piston has two parts and an intermediate rod, the first part including said working surface, the rod engaged to a drive means, and the second part spaced from the first and having a pressure surface, and (b) the buffer space defines a cylindrical space in which said second part is reciprocally movable, said pressure surface being adjacent the buffer space fluid and being substantially smaller in area than the working surface area of the first part.

7. A hot gas engine as defined in claim 6, wherein said auxiliary piston comprises two parts, the first including a first surface adjacent working medium in said first space, and a second part having a second surface adjacent buffer fluid in said second space, the first surface having substantially more area than the second surface.

8. A hot gas engine having a plurality of cooperating piston and cylinder means as defined in claim 7 and a single auxiliary chamber in communication with the buffer spaces of all the cylinders.

9. A hot gas engine as defined in claim 1 further comprising:

(a) a second cylinder aligned and secured to the first and oriented opposite thereto, (b) the compression pistons joined by a single common rod, (c) the displacer pistons joined by a single common rod, (d) each cylinder including a rolling diaphragm seal between the walls thereof and the compression piston, and another seal between the displacer rod and compression piston.

10. A hot gas engine comprising a cylinder, a regenerator, piston and displacer members reciprocally movable within the cylinder and defining with the cylinder two variable volume working spaces operative at relatively high and low mean temperatures respectively, the spaces communicating with each other through the regenerator, with compressible working medium flowable between said spaces and regenerator and resulting pressure forces applied to a first end surface of said piston adjacent a working space, the cylinder and the piston's opposite surface defining a third, buffer space remote from said working spaces for containing a liquid, and means applying pressure to the liquid and thus to this opposite surface for neutralizing the pressure on said piston from medium in said working spaces.

11. Apparatus according to claim 10 further comprising a rolling diaphragm seal between the piston and the adjacent inner walls of the cylinder, one side of the seal facing a working space, said piston and walls defining adjacent the seal's opposite side an annular space for a liquid for supporting the seal, and regulating means for maintaining the pressure differential across the seal substantially constant.

12. Apparatus according to claim 11 wherein the displacer has an extending rod slidable within a central bore of the piston, further comprising a second rolling diaphragm seal between said rod and adjacent bore of the piston, one side of the seal facing a working space, the rod and piston defining, adjacent the second seal's opposite side, a second annular space for containing liquid to support said seal, the regulating means also maintaining the pressure across the second seal substantially constant.

13. Apparatus according to claim 12 wherein the product of the liquid pressure force in the buffer space and the piston's opposite surface is substantially equal to the product of the mean pressure force in the working space and the first end surface of the piston.

14. Apparatus as defined in claim 12 further comprising pumping means for supplying liquid to said annular space.

15. An apparatus according to claim 10 wherein the product of the liquid pressure force in the buffer space and the piston's opposite surface is substantially equal to the product of the mean pressure force in the working space and the first end surface of said piston.

16. Apparatus as defined in claim 10 further comprising an auxiliary piston and cylinder combination in communication with said buffer space and liquid therein, the auxiliary piston movable to apply pressure to said liquid, the diameter of said auxiliary piston being smaller than the opposite surface area of said piston upon which the liquid pressure is applied, the pressure force on the auxiliary piston being higher than said pressure force applied against said opposite surface of the piston.

References Cited

UNITED STATES PATENTS

| | | | |
|---|---|---|---|
| 3,204,858 | 7/1965 | Dros | 92—100X |
| 3,318,100 | 5/1967 | Reinhoudt et al. | 62—6 |
| 3,364,675 | 1/1968 | Dorer | 60—24 |
| 3,372,539 | 3/1968 | Reinhoudt | 60—24 |
| 3,397,533 | 8/1968 | Steiner | 60—24 |

MARTIN P. SCHWADRON, Primary Examiner

L. J. PAYNE, Assistant Examiner

U.S. Cl. X.R.

62—6